N. M. PURVIANCE.
COMPUTING DEVICE.
APPLICATION FILED MAR. 10, 1921.
1,426,332.
Patented Aug. 15, 1922.
3 SHEETS—SHEET 3.
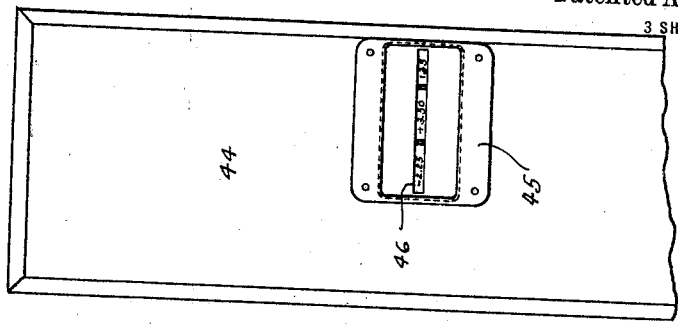
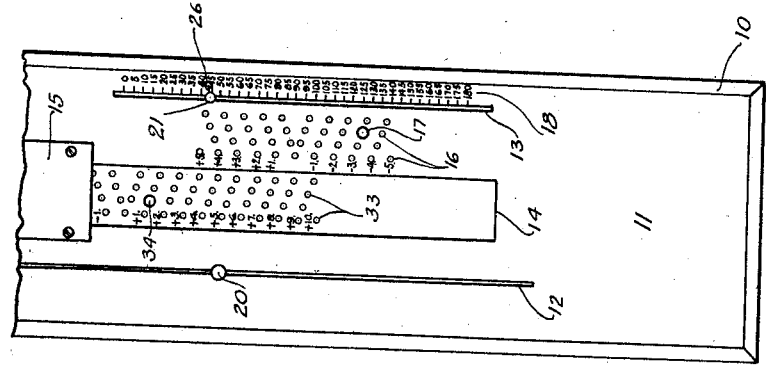
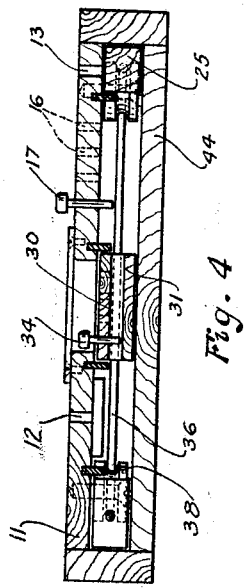
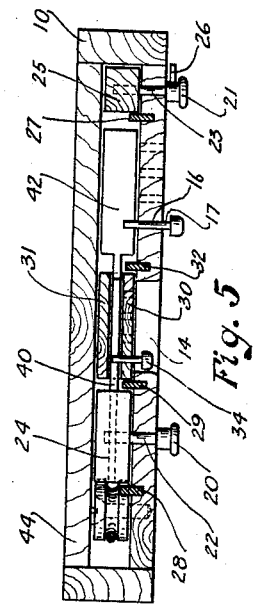
Witnesses:
Inventor
Nathan M. Purviance
His Attorney

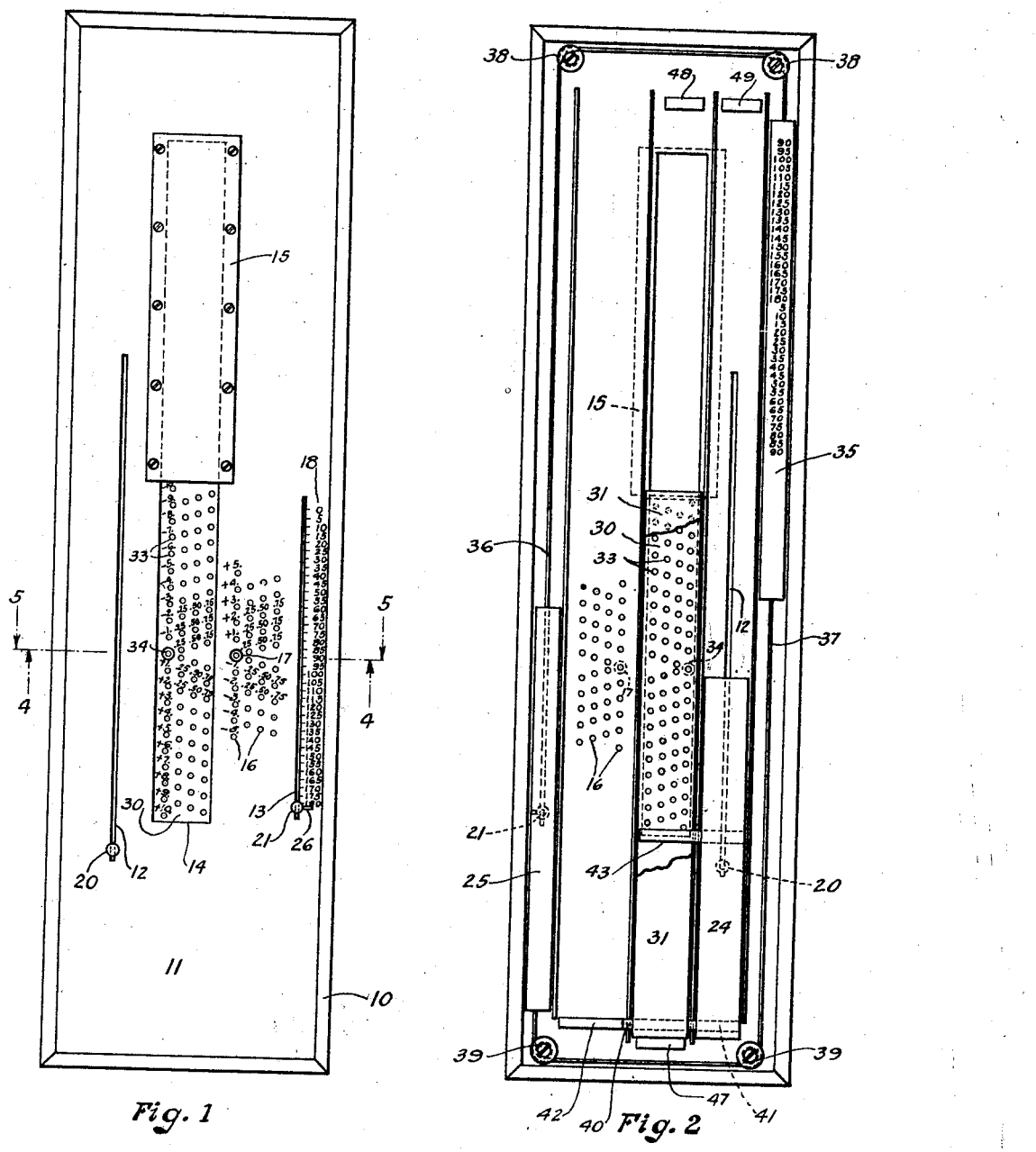

UNITED STATES PATENT OFFICE.

NATHAN M. PURVIANCE, OF LEWISTON, IDAHO.

COMPUTING DEVICE.

1,426,332. Specification of Letters Patent. Patented Aug. 15, 1922.

Application filed March 10, 1921. Serial No. 451,235.

*To all whom it may concern:*

Be it known that I, NATHAN M. PURVIANCE, a citizen of the United States, and a resident of the city of Lewiston, county of Nez Perce, and State of Idaho, have invented certain new and useful Improvements in Computing Devices, of which the following is a specification.

My invention relates to new and useful improvements in computing devices, and has for its particular object the provision of a device for use by opticians with which the transposition of lenses used in spectacles may be easily and speedily determined.

Other objects will appear hereinafter.

The invention consists in the combinations and arrangements of parts hereinafter described and claimed.

The invention will be best understood by reference to the accompanying drawings forming a part of this specification, and in which, Fig. 1 is a view of the front or adjusting side of my invention, with the members in position of rest;

Fig. 2 is a back view, with the back cover removed, the slidable members being shown in the position of rest and one of said members broken open;

Fig. 4 is a sectional view on line 4—4 of Fig. 1;

Fig. 5 is a sectional view on line 5—5 of Fig. 1;

Fig. 6 is a partial front view, with the slidable members moved into operative positions as shown; and Fig. 7 is a rear view, showing the result obtained by moving the members into the position shown in Fig. 6.

Figure 3:
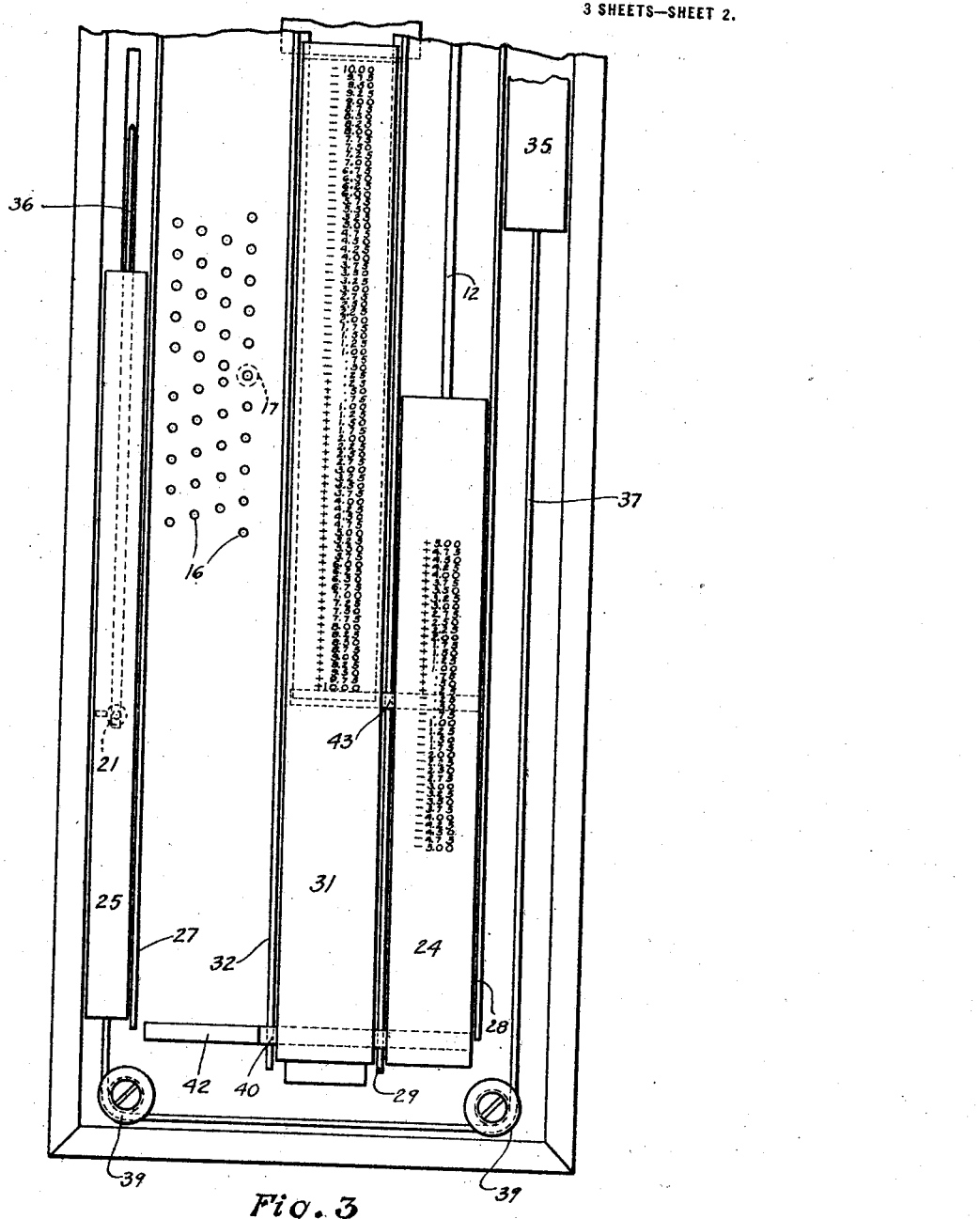
Fig. 3 is an enlarged view of the lower part of Fig. 2.

The invention illustrated comprises a housing 10, in the front of which is mounted a face or front board 11 provided with slots 12 and 13 and a rectangular opening 14 over the upper portion of which is mounted a plate 15. At the side of the opening 14, several rows of numbered perforations 16 are provided in which a stop 17 is mountable. A numbered scale 18 is placed at one side of the slot 13. Knobs 20 and 21 are carried on the front ends of stems 22 and 23, respectively, which extend through the slots 12 and 13, respectively, and are fastened on slidable bars 24 and 25, respectively, as best shown in Fig. 5. Said member 21 bears an index finger 26 which passes over the scale 18. The bar 25 slides between the side member of the housing and a longitudinally extending rib 27, and the bar 24 slides between similar ribs 28 and 29 fastened to the front member 11 of the housing. A hollow member, composed of a front plate 30 and a rear plate 31 suitably connected at their ends, is slidably mounted in the casing, between the rib 29 and a similar rib 32. Rows of numbered perforations 33 are provided in the front member 30, arranged in the manner shown in Figs. 1 and 6, in which a stop 34 is insertable. A series of consecutive numbers are provided on the rear face of the bar 24, as indicated in Fig. 3. The plate 31 is similarly provided with a series of numbers on its rear face. The sets of numbers heretofore referred to are consecutively arranged above and below a zero line, the numbers on one side being provided with the minus sign and the numbers on the other side with the plus sign. The bar 25 is connected with a similar bar 35 by means of cables 36 and 37 passing over pulleys 38 and 39, respectively. A series of numbers is provided on said bar 35, arranged as shown in Fig. 2. An arm 40 is fastened on the lower end of the bar 24, as at 41, and extends laterally through the hollow member, being provided with a part 42 which extends beyond said hollow member and is adapted to engage beneath the stop 17 inserted in the perforation 16 to limit the upward movement of the bar 24. Another arm 43 is fastened on the bar 24 near its middle portion, and extends into said hollow member, engaging beneath the stop 34 inserted in the perforations 33 in the plate 30 (see Fig. 2), to carry said hollow member upwards along with the bar 24. A cover 44 is mounted on the back of the housing (see Figs. 5 and 7), and a window plate 45, provided with a window 46, is set into said cover. Stop blocks 47 and 48 are provided to limit the downward and upward movement respectively, of the hollow member, and a stop block 49 is mounted adjacent the block 48, adapted to limit the upward movement of the bar 24.

Normally the members are at rest in their lowermost position, as shown in Figs. 1 to 5 inclusive, and when it is desired to use the device to calculate the transposition of lenses, in fitting spectacles the knob 21 with its index finger 26 is raised to the desired position on the scale 18, setting it on —45, for example, as shown in Fig. 6, to indicate the axis. Said knob 21 raises the attached bar 25 (see Fig. 5), and through the cables 36 and 37 moves the bar 35 on the opposite side downwards (see Fig. 2), bringing the proper number of said bar 35 under the window 46, in the present case number 135, which indicates the transposed axis. The stop 17 is next set in proper position in the numbered perforations 16, to indicate the cylinder, which in the present case is —3.5, and the stop 34 is set in the proper position in the numbered perforations 33, to indicate the sphere, which in the present case is +1.25, as shown in Fig. 6. The knob 20 is then moved upwards in the slot 12, carrying with it the attached bar 24 and its arms 40 and 43 (see Figs. 2 and 3). When the arm 43 reaches the stop 34 inserted in one of the perforations 33, it carries with it the hollow member, composed of plates 30 and 31, until the extension 42 of arm 40 engages beneath stop 17, which limits the upward travel of said bar 24 and said hollow member. By this manipulation, the numbers on the back of each of said members are brought in alignment with the proper number on the back of the member 35, the three required numbers being readable through the window 46 on the back of the device, giving the required transposed sphere, cylinder, and axis, which in the present case is —2.25+350, and 135 respectively, as shown in Fig. 7, and as is well understood by those skilled in this art.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. A computing device of the class described, comprising a housing provided with an opening in its front wall; slidable means mounted in said housing, including a member mounted beneath said opening and having means adjustably attached thereto; numbers on the rear faces of said members; means extending from one of said slidable members adapted to engage said adjustable means and raise the slidable member attached thereto; and means displaying the result from said rear numbers.

2. A computing device of the class described, comprising a housing provided with groups of numbers on its front face; slidable members mounted in said housing, each of said slidable members being provided with a row of numbers on its rear face; means to set said members in position with regard to said front numbers, including a part of one of said members engaging means adjustable on said housing to limit the movement of said member; and means displaying the result obtained by said rear numbers by the setting of said members.

3. A computing device of the class described, comprising a housing provided with groups of numbers on its front face; slidable members mounted in said housing, each of said members being provided with a row of numbers on its rear face; means to set said members in position in accordance with said front numbers, including an arm on one of said members to engage means on another member and move said members in unison; and a window to display the resultant number of each rear row obtained by the setting of said members.

4. A computing device of the class described, comprising a housing provided with groups of numbers on its front face; slidable members mounted in said housing, each of said members being provided with a row of numbers on its rear face; means, including stems extending to the front face of said housing, to set said members; and means displaying the result obtained by such setting.

5. A computing device of the class described, comprising a housing provided with an opening in its front wall; slidable members mounted in said housing, including a member mounted beneath said opening and having numbered perforations in its front wall; columns of numbers on the rear faces of said members; a stop adapted to be inserted in either of said perforations; an arm on one of said slidable members, adapted to engage said stop to raise said perforated member; and means to operate said members.

6. A computing device comprising a housing; slidable members mounted therein, which bear operating stems extending to the front wall of said housing; a row of numbers on the rear face of one of said members; additional slidable members mounted in the housing and bearing numbers on the rear faces; an arm on one of said members and a pin on another of said members engageable by said arm to move the two in unison; and cable connections between two of said members.

7. A computing device of the class described, comprising a housing provided with an opening in its front wall; slidable members mounted in said housing, including a member mounted beneath said opening and having means adjustably attached thereto; numbers on the rear face of said slidable members; means extending from one of said slidable members, adapted to engage said adjustable means and raise the member attached thereto; means adjustably positioned in said housing; means on one of said slidable members to engage said adjustable means on the housing and limit the movement of said slidable members; and a window to display the result obtained by said rear members.

8. A computing device of the class described, comprising a housing provided with an opening in its front wall; slidable members mounted in said housing, including a member mounted beneath said opening and having numbered perforations in its front wall; columns of numbers provided on the front face of said housing; columns of numbers on the rear face of said slidable members; a stop adapted to be inserted in either of said perforations; an arm on one of said slidable members adapted to engage said stop to raise said perforated member; a stop adjustably mounted in said housing; means on said member carrying the arm for engaging said second stop to limit the movement of said slidable members; and a window to display the result obtained by said rear numbers.

In testimony whereof I have signed my name to this specification in the presence of two subscribing witnesses.

NATHAN M. PURVIANCE.

Witnesses:
J. H. BETHEL,
Mrs. R. L. MARSHALL.